United States Patent
Kim et al.

(10) Patent No.: US 12,489,145 B2
(45) Date of Patent: Dec. 2, 2025

(54) ELECTROLYTE AND LITHIUM SECONDARY BATTERY COMPRISING SAME

(71) Applicant: LG Energy Solution, Ltd., Seoul (KR)

(72) Inventors: Yunjung Kim, Daejeon (KR); Suenghoon Han, Daejeon (KR); Kihyun Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 553 days.

(21) Appl. No.: 17/919,488

(22) PCT Filed: Oct. 20, 2021

(86) PCT No.: PCT/KR2021/014720
§ 371 (c)(1),
(2) Date: Oct. 17, 2022

(87) PCT Pub. No.: WO2022/092691
PCT Pub. Date: May 5, 2022

(65) Prior Publication Data
US 2023/0163360 A1    May 25, 2023

(30) Foreign Application Priority Data
Oct. 27, 2020    (KR) .......... 10-2020-0140155

(51) Int. Cl.
*H01M 10/0569*    (2010.01)
*H01M 10/052*    (2010.01)
*H01M 10/0568*    (2010.01)

(52) U.S. Cl.
CPC ..... *H01M 10/0569* (2013.01); *H01M 10/052* (2013.01); *H01M 10/0568* (2013.01); *H01M 2300/0037* (2013.01)

(58) Field of Classification Search
None
See application file for complete search history.

(56) References Cited

U.S. PATENT DOCUMENTS

| | | |
|---|---|---|
| 2002/0045102 A1 | 4/2002 | Jung et al. |
| 2003/0073005 A1 | 4/2003 | Kim et al. |

(Continued)

FOREIGN PATENT DOCUMENTS

| | | |
|---|---|---|
| CN | 104051786 A | 9/2014 |
| CN | 107534184 A | 1/2018 |

(Continued)

OTHER PUBLICATIONS

WO 2017099420 A1 Abstract Translation (Year: 2017).*

(Continued)

*Primary Examiner* — Kevin M Bernatz
(74) *Attorney, Agent, or Firm* — Bryan Cave Leighton Paisner LLP (57) ABSTRACT

An electrolyte solution for a lithium secondary battery and a lithium secondary battery comprising the same are provided. The electrolyte solution comprises a first solvent comprising a heterocyclic compound containing one or more double bonds and any one of an oxygen atom or a sulfur atom; a second solvent comprising at least one of an ether-based compound, an ester-based compound, an amide-based compound, or a carbonate-based compound; a lithium salt; zirconium oxynitrate; and lithium nitrate.

10 Claims, 2 Drawing Sheets

(56) References Cited

U.S. PATENT DOCUMENTS

| | | | |
|---|---|---|---|
| 2005/0175904 A1 | 8/2005 | Gorkovenko | |
| 2006/0199080 A1 | 9/2006 | Amine et al. | |
| 2007/0212615 A1 | 9/2007 | Jost et al. | |
| 2014/0342242 A1 | 11/2014 | Egorov et al. | |
| 2016/0322665 A1 | 11/2016 | Kim et al. | |
| 2016/0336625 A1 | 11/2016 | Jeong et al. | |
| 2018/0294476 A1 | 10/2018 | Zhamu et al. | |
| 2018/0375150 A1* | 12/2018 | Yamamoto | G04C 10/00 |
| 2019/0051940 A1* | 2/2019 | Park | H01M 10/0569 |
| 2019/0198918 A1* | 6/2019 | Yamamoto | H01M 10/0562 |
| 2019/0372165 A1* | 12/2019 | Sakamoto | H01M 10/0568 |
| 2020/0014066 A1* | 1/2020 | Shiraga | H01M 10/0568 |
| 2021/0242502 A1 | 8/2021 | Ha et al. | |

FOREIGN PATENT DOCUMENTS

| | | | |
|---|---|---|---|
| CN | 107645016 A | 1/2018 | |
| CN | 108281659 A | 7/2018 | |
| CN | 109088101 A | 12/2018 | |
| EP | 3282514 A1 | 2/2018 | |
| JP | 2002-075446 A | 3/2002 | |
| JP | 2008-532248 A | 8/2008 | |
| JP | 2016-219411 A | 12/2016 | |
| JP | 2018519620 | 7/2018 | |
| KR | 10-2003-0031396 A | 4/2003 | |
| KR | 10-0578797 B1 | 5/2006 | |
| KR | 10-2006-0135958 A | 12/2006 | |
| KR | 10-2007-0027512 A | 3/2007 | |
| KR | 10-2008-0067964 A | 7/2008 | |
| KR | 10-2014-0135038 A | 11/2014 | |
| KR | 10-2015-0072239 A | 6/2015 | |
| KR | 10-2016-0128014 A | 11/2016 | |
| KR | 10-2017-0067648 A | 6/2017 | |
| KR | 10-2017-0084452 A | 7/2017 | |
| KR | 10-2018-0114631 A | 10/2018 | |
| KR | 10-2020-0061293 A | 6/2020 | |
| WO | WO-2017099420 A1 * | 6/2017 | H01M 10/052 |
| WO | 2020105981 | 5/2020 | |

OTHER PUBLICATIONS

WO 2017099420 A1 Machine Translation (Year: 2017).*

Machine Translation of JP 2013-020915 A (Year: 2013).*

Chao, S. et al., "Solid-state microelectrochemistry: electrical characteristics of a solid-state microelectrochemical transistor based on poly(3-methylthiophene)", Journal of the American Chemical Society 109(7), (1987) 2197-2199.

Wu Yang et al., "Pyrrole as a promising electrolyte additive to trap polysulfides for lithium-sulfur batteries", Journal of Power Sources 348 (2017) 175-182.

Jie Li et al., "ZrO(No3)2 as a functional additive to suppress the diffusion of polysulfides in lithium-Sulfur batteries", Journal of Power Sources 442 (2019) 227232.

* cited by examiner

ELECTROLYTE AND LITHIUM SECONDARY BATTERY COMPRISING SAME

CROSS-REFERENCE TO RELATED APPLICATION

The present application is a National Stage Application of International Application No. PCT/KR2021/014720, filed on Oct. 20, 2021, which claims the benefit of priority based on Korean Patent Application No. 10-2020-0140155 filed on Oct. 27, 2020, the disclosures of which are incorporated herein by reference in their entirety.

FIELD OF DISCLOSURE

The present disclosure relates to an electrolyte solution for a lithium secondary battery and a lithium secondary battery comprising the same, more particularly, to an electrolyte solution for a lithium secondary battery, which is capable of improving the capacity and lifetime of the lithium secondary battery by combining a solvent, a lithium salt, and an additive contained in the electrolyte solution of the lithium secondary battery in an optimal ratio, and a lithium secondary battery comprising the same.

BACKGROUND

As the application of energy storage technology extends to mobile phones, tablets, laptops, and camcorders, and further to electric vehicles (EVs) and hybrid electric vehicles (HEVs), research and development of electrochemical devices are gradually increasing. Electrochemical devices are the field that is receiving the most attention in this respect, and among them, the development of secondary batteries such as a lithium-sulfur battery capable of charging and discharging has been a focus of interest. In recent years, in order to improve the capacity density and specific energy in developing such a battery, research and development on the design of new electrodes and batteries has been conducted.

Among such electrochemical devices, a lithium-sulfur battery (Li—S battery) has a high energy density (theoretical capacity) and thus is in the spotlight as a next-generation secondary battery that can replace the lithium ion-battery. In such a lithium-sulfur battery, the reduction reaction of sulfur and the oxidation reaction of lithium metal take place during discharging, and at this time, sulfur forms lithium polysulfide (LiPS) having a linear structure from $S_8$ having a cyclic structure. This lithium-sulfur battery is characterized by showing a stepwise discharging voltage until the polysulfide is completely reduced to $Li_2S$.

However, the biggest obstacle in the commercialization of the lithium-sulfur battery is lifetime, and during the charging/discharging process, the charging/discharging efficiency is reduced and the lifetime of the battery is deteriorated. The causes of such deterioration of the lifetime of the lithium-sulfur battery are various, such as the side reactions of the electrolyte solution (deposition of by-products due to the decomposition of the electrolyte solution), the instability of lithium metal (dendrite grows on the lithium negative electrode, causing a short circuit), and the deposition of positive electrode by-products (leaching of lithium polysulfide from the positive electrode).

That is, in a battery using a sulfur-based compound as a positive electrode active material and using an alkali metal such as lithium as a negative electrode active material, the leaching and shuttle phenomenon of lithium polysulfide occurs during charging/discharging, and the lithium polysulfide is transferred to the negative electrode, thereby reducing the capacity of the lithium-sulfur battery, and thus the lithium-sulfur battery has a major problem in that its lifetime is reduced and its reactivity is reduced. That is, since polysulfide leached from the positive electrode has high solubility in the organic electrolyte solution, it can undesirably move toward the negative electrode (PS shuttling) through the electrolyte solution. As a result, a decrease in capacity occurs due to irreversible loss of the positive electrode active material, and a decrease in the lifetime of the battery occurs due to deposition of sulfur particles on the surface of the lithium metal by side reactions.

Meanwhile, the behavior of such a lithium-sulfur battery can vary greatly depending on the electrolyte solution. The electrolyte solution when sulfur in the positive electrode is leached into the electrolyte solution in the form of lithium polysulfide (LiPS) is called Catholyte and the electrolyte solution when sulfur hardly leaches out in the form of lithium polysulfide is called sparingly soluble or solvating electrolyte (SSE). That is, in the art, Various studies on a lithium-sulfur battery in which sulfur, a positive electrode active material, does not leach into the electrolyte solution (studies such as adding LiPS adsorption material to positive electrode composites or modifying separators made of existing PE, etc.) are being conducted, and in particular, studies on an electrolyte solution capable of proceeding a solid-to-solid reaction in which sulfur is converted to $Li_2S$, the final discharging product are also being conducted, but it has not yet achieved such results. Accordingly, there is a need for a more fundamental method to suppress phenomenon that lithium polysulfide moves to the negative electrode and thus decreases the lifetime of the lithium-sulfur battery and that that the reactivity decreases due to a large amount of lithium polysulfide.

Therefore, in the present technical field, attempts to prevent the problems of side reactions of the electrolyte solution, etc., have been continued, but it is still difficult to fundamentally solve the problems. Therefore, it is required to develop an electrolyte solution for a lithium secondary battery that can dramatically improve the reactivity and lifetime performance of the lithium secondary battery.

RELATED ART

Chinese Laid-open Patent Publication No 109088101

SUMMARY

It is an object of the present disclosure to provide an electrolyte solution for a lithium secondary battery, which is capable of improving the capacity and lifetime of the lithium secondary battery by combining a solvent, a lithium salt, and an additive contained in the electrolyte solution of the lithium secondary battery in an optimal ratio, and a lithium secondary battery comprising the same.

In order to achieve the above object, the present disclosure provides an electrolyte solution for a lithium secondary battery, which comprises a first solvent comprising a heterocyclic compound containing one or more double bonds and any one of an oxygen atom or a sulfur atom; a second solvent comprising at least one of an ether-based compound, an ester-based compound, an amide-based compound, or a carbonate-based compound; a lithium salt; zirconium oxynitrate; and lithium nitrate.

In addition, the present disclosure provides a lithium secondary battery comprising a positive electrode; a negative electrode; a separator between the positive electrode and the negative electrode; and the electrolyte solution.

According to the electrolyte solution and the lithium secondary battery comprising the same according to the present disclosure, there is an advantage that the capacity and lifetime of the lithium secondary battery may be improved by combining a solvent, a lithium salt, and an additive contained in the electrolyte solution of the lithium secondary battery in an optimal ratio, and more specifically, the performance of the battery such as a cycle lifetime may be improved by further incorporating zirconium oxynitrate which has advantages of improving the coulombic efficiency of the lithium-sulfur battery and so on.

DETAILED DESCRIPTION

Hereinafter, the present disclosure will be described in detail.

The electrolyte solution for the lithium secondary battery according to the present disclosure comprises A) the first solvent comprising a heterocyclic compound containing one or more double bonds and at the same time, containing any one of an oxygen atom and a sulfur atom, B) the second solvent comprising at least one of an ether-based compound, an ester-based compound, an amide-based compound, or a carbonate-based compound, C) a lithium salt, D) zirconium oxynitrate and E) lithium nitrate.

At the present time when the development of a new electrolyte solution for the lithium secondary battery capable of dramatically improving the lifetime performance of the battery is required, the present applicant has developed an electrolyte solution for a lithium secondary battery, which is capable of improving the capacity and lifetime of the lithium secondary battery by combining a solvent, a lithium salt, and an additive contained in the electrolyte solution of the lithium secondary battery in an optimal ratio, and more specifically, improving the performance of the battery such as a cycle lifetime by combining zirconium oxynitrate, which has been confirmed to have advantages of improving the coulombic efficiency of the lithium-sulfur battery and so on, with a compound used as a component of the existing electrolyte solution, That is, an electrolyte solution applicable to lithium secondary batteries such as a lithium-sulfur battery relates to differences in the performance such as the lifetime or efficiency of the battery depending on the type of the solvent, the lithium salt, and the additive contained in the electrolyte solution. Accordingly, after repeated studies to find a way to improve the performance of the lithium secondary battery, the applicant of the present disclosure has derived the present disclosure with improved reactivity and lifetime, etc. by, i) incorporating 'zirconium oxynitrate ($ZrO(NO_3)_2$)', which has advantages such as an effect of improving the coulombic efficiency of a lithium-sulfur battery, into an electrolyte solution (exactly, replacing a part of $LiNO_3$ used in the role to prevent lithium polysulfide from moving in a direction from the positive electrode to the negative electrode and thus resulting in the occurrence of self-discharging and overcharging phenomenon), and at the same time, ii) changing 1,3-dioxolane (DOL) used as a component of the existing electrolyte solution to 'a solvent comprising a heterocyclic compound containing one or more double bonds and at the same time, containing any one of an oxygen atom or a sulfur atom (the first solvent)', and iii) also, likewise, changing LiTFSI used as a component of the existing electrolyte solution to 'another lithium salt such as LiFSI'.

Hereinafter, each of A) the first solvent, B) the second solvent, C) the lithium salt, D) the zirconium oxynitrate and E) the lithium nitrate comprised in the electrolyte solution of the present disclosure will be described in detail.

A) First Solvent

The first solvent comprises a heterocyclic compound containing one or more double bonds and at the same time containing any one of an oxygen atom or a sulfur atom, which has the property of being difficult to dissolve salts due to the delocalization of the lone pair electrons of the hetero atom (oxygen atom or sulfur atom), and thus can suppress the generation of lithium dendrites by forming a polymer protective film (solid electrolyte interface, SEI layer) on the surface of a lithium-based metal (negative electrode) by a ring opening reaction of a heterocyclic compound in the initial discharging stage of the battery, and can further improve the lifetime characteristics of the lithium-sulfur battery by reducing the decomposition of the electrolyte solution on the surface of lithium-based metal and subsequent side reactions.

That is, the heterocyclic compound of the present disclosure must necessarily contain one or more double bonds in order to form a polymeric protective film on the surface of a lithium-based metal, and must also necessarily contain a hetero atom (oxygen atom or sulfur atom) to exhibit an effect such as increasing the affinity with other solvents in the electrolyte solution by making it polar.

The heterocyclic compound may be a 3 to 15 membered, preferably 3 to 7 membered, more preferably 5 to 6 membered heterocyclic compounds. In addition, the heterocyclic compound may be a heterocyclic compound substituted or unsubstituted by at least one selected from the group consisting of an alkyl group having 1 to 4 carbon atoms, a cyclic alkyl group having 3 to 8 carbon atoms, an aryl group having 6 to 10 carbon atoms, a halogen group, a nitro group ($-NO_2$), an amine group ($-NH_2$), and a sulfonyl group ($-SO_2$). In addition, heterocyclic compound may be a multicyclic compound of a heterocyclic compound and at least one of a cyclic alkyl group having 3 to 8 carbon atoms and an aryl group having 6 to 10 carbon atoms.

When the heterocyclic compound is substituted with an alkyl group having 1 to 4 carbon atoms, it is preferable because radicals are stabilized and side reactions between electrolyte solutions can be suppressed. In addition, when substituted with a halogen group or a nitro group, it is preferable because a functional protective film can be formed on the surface of a lithium-based metal, and at this time, the formed functional passivation layer is a compacted passivation layer, and thus has an advantage of being stable, enabling uniform deposition of the lithium-based metal and suppressing side reactions between the polysulfide and the lithium-based metal.

Specific examples of the heterocyclic compound may be furan, 2-methylfuran, 3-methylfuran, 2-ethylfuran, 2-propylfuran, 2-butylfuran, 2,3-dimethylfuran, 2,4-dimethylfuran, 2,5-dimethylfuran, pyran, 2-methylpyran, 3-methylpyran, 4-methylpyran, benzofuran, 2-(2-nitrovinyl)furan, thiophene, 2-methylthiophene, 2-ethylthiophene, 2-propylthiophene, 2-butylthiophene, 2,3-dimethylthiophene, 2,4-dimethylthiophene, 2,5-dimethylthiophene and the like. Among these, it is preferable to use 2-methylfuran as the first solvent.

The first solvent comprising such a heterocyclic compound may be contained in a volume ratio of 5 to 50, preferably 10 to 40, and more preferably 15 to 30, relative to 100 volume ratio of the total organic solvent (i.e., first solvent+second solvent) contained in the electrolyte solution for the lithium secondary battery of the present disclosure (the remaining volume ratio corresponds to the second solvent). If the first solvent is contained in less than 5 volume ratio relative to 100 volume ratio of the total organic solvent of the present disclosure, there may be a problem that the ability to reduce the leaching amount of the polysulfide decreases, and thus the increase in the resistance of the electrolyte solution cannot be suppressed, or the protective film is not completely formed on the surface of the lithium-based metal. In addition, if the first solvent is contained in an amount of more than 50 volume ratio relative to 100 volume ratio of the total organic solvent of the present disclosure, there is a concern that a problem of decreasing the capacity and lifetime of the battery may occur due to the increase in the surface resistance of the electrolyte solution and the lithium-based metal.

B) Second Solvent

The second solvent comprises at least one of an ether-based compound, an ester-based compound, an amide-based compound, or a carbonate-based compound, and not only dissolves the lithium salt to give the electrolyte solution a lithium ion conductivity, but also elutes sulfur, which is a positive electrode active material, so that the electrochemical reaction with lithium can proceed smoothly. In the case of the carbonate-based compound, it may be a linear carbonate-based compound or a cyclic carbonate-based compound.

Specific examples of the ether-based compound may be, but is not limited to, at least one selected from the group consisting of dimethyl ether, diethyl ether, dipropylether, methylethylether, methylpropylether, ethylpropylether, dimethoxyethane, diethoxyethane, methoxyethoxyethane, diethylene glycol dimethylether, diethylene glycol diethylether, diethylene glycol methylethylether, triethylene glycol dimethylether, triethylene glycol diethylether, triethylene glycol methylethylether, tetraethylene glycol dimethylether, tetraethylene glycol diethylether, tetraethylene glycol methylethylether, polyethylene glycol dimethylether, polyethylene glycol diethylether, and polyethylene glycol methylethylether. Among these, it is preferable to use dimethoxyethane as the second solvent.

In addition, the ester-based compound may be, but is not limited to, at least one selected from the group consisting of methyl acetate, ethyl acetate, propyl acetate, methyl propionate, ethyl propionate, propyl propionate, γ-butyrolactone, γ-valerolactone, γ-caprolactone, σ-valerolactone, and ε-caprolactone. In addition, the amide-based compound may be a conventional amide-based compound used in the art.

In addition, the linear carbonate-based compound may be, but is not limited to, at least one selected from the group consisting of dimethyl carbonate (DMC), diethyl carbonate (DEC), dipropyl carbonate (DPC), ethylmethyl carbonate (EMC), methylpropyl carbonate (MPC) and ethylpropyl carbonate (EPC).

In addition, the cyclic carbonate-based compound may be, but is not limited to, at least one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinylethylene carbonate and halides thereof (fluoroethylene carbonate (FEC), etc.).

Meanwhile, if the second solvent is contained in less than an appropriate amount, there is a concern that the lithium-ion conductivity decreases because the lithium salt cannot be sufficiently dissolved, and that sulfur, which is an active material, exceeds the concentration at which it can be dissolved, and thus a problem of precipitation may occur. If the second solvent is contained in excess, there may be a problem that sulfur, which is an active material, is excessively leached, resulting in a severe shuttle phenomenon of lithium polysulfide and lithium negative electrode and a decrease in lifetime.

Meanwhile, the organic solvent comprising the first solvent and the second solvent may be contained in an amount of 70 to 97 wt. %, preferably 75 to 95 wt. %, more preferably 80 to 95 wt. %, relative to the total weight of the electrolyte solution for the lithium secondary battery of the present disclosure. If the organic solvent is contained in an amount of less than 70 wt. % based on the total weight of the electrolyte solution for the lithium secondary battery, there may be a problem that the viscosity of the electrolyte solution is increased and the ion conductivity is decreased or a problem that the lithium salt or additive is not completely soluble in the electrolyte solution. If the organic solvent is contained in an amount exceeding 97 wt. %, there may be a problem that the concentration of the lithium salt in the electrolyte solution is decreased, and thus the ion conductivity is decreased.

C) Lithium Salt

The lithium salt is an electrolyte salt used to increase ion conductivity, and examples of the lithium salt may be at least one selected from the group consisting of LiCl, LiBr, LiI, $LiClO_4$, $LiBF_4$, $LiB_{10}Cl_{10}$, $LiPF_6$, $LiCF_3SO_3$, $LiCF_3CO_2$, $LiC_4BO_8$, $LiAsF_6$, $LiSbF_6$, $LiAlCl_4$, $CH_3SO_3Li$, $CF_3SO_3Li$, $(C_2F_5SO_2)_2NLi$, $(SO_2F)_2NLi$, $(CF_3SO_2)_3CLi$, lithium chloroborane, lithium carboxylate of short-chain aliphatic carboxylic acid having 4 or less carbon atoms, lithium 4-phenyl borate and lithium imide. Among these, it is preferable to use LiFSI ($(SO_2F)_2NLi$) as an essential component. In addition, the electrolyte solution of the present disclosure is characterized in that it does not contain LiTFSI ($(CF_3SO_2)_2NLi$).

The concentration of the lithium salt may be determined in consideration of ion conductivity and the like, and may be, for example, 0.2 to 2 M, preferably 0.5 to 1 M. If the concentration of the lithium salt is less than the above range, it may be difficult to secure ion conductivity suitable for operating a battery. If the concentration of the lithium salt exceeds the above range, as the viscosity of the electrolyte solution increases, the mobility of lithium ions decreases, or the decomposition reaction of the lithium salt itself increases, and thus the performance of the battery may be deteriorated.

D) Zirconium Oxynitrate

Zirconium oxynitrate ($ZrO(NO_3)_2$) is a component used to improve the coulombic efficiency (C.E.) of the battery and ultimately improve the lifetime of the battery, and there have been a case where it was used as a component of an electrolyte solution in the past (Chinese Laid-open Patent Publication No. 109088101). However, in that case, LiTFSI was used as a lithium salt, and nitrate-based compounds such as lithium nitrate, which will be described later, were not included, and thus it did not fundamentally improve the problem of deterioration of battery lifetime.

However, the present disclosure with improved reactivity and lifetime is derived by changing 1,3-dioxolane (DOL) used as a component of the existing electrolyte solution to 'a solvent comprising a heterocyclic compound containing one or more double bonds and at the same time containing any one of an oxygen atom and a sulfur atom (the first solvent)', even while using zirconium oxynitrate, and also by changing LiTFSI used as a component of the existing electrolyte solution to 'another lithium salt such as LiFSI' and also using a nitric acid-based compound such as lithium nitrate together.

The zirconium oxynitrate as described above may be contained in an amount of no less than 0.1% by weight to no more than 2% by weight, preferably 0.5 to 1.5% by weight, relative to the total weight of the electrolyte solution for the lithium secondary battery. If the zirconium oxynitrate is contained in an amount of less than 0.1% by weight relative to the total weight of the electrolyte solution, there is a risk of problems that the degree of improvement of the coulombic efficiency of the battery becomes insignificant and thus the degree of improvement of the lifetime becomes also insignificant. If the zirconium oxynitrate exceeds 2% by weight, it is not dissolved or dispersed in a solvent, and a precipitation phenomenon may occur.

E) Lithium Nitrate

In addition, the electrolyte solution for the lithium secondary battery according to the present disclosure basically contains lithium nitrate ($LiNO_3$). However, if necessary, it may further contain at least one selected from the group consisting of lanthanum nitrate ($La(NO_3)_3$), potassium nitrate ($KNO_3$), cesium nitrate ($CsNO_3$), magnesium nitrate ($MgNO_3)_2$, barium nitrate ($BaNO_3)_2$, lithium nitrite ($LiNO_2$), potassium nitrite ($KNO_2$) and cesium nitrite ($CsNO_2$).

The lithium nitrate may be contained in an amount of 1 to 7 wt. %, preferably 2 to 6 wt. %, more preferably 3 to 5 wt. %, relative to the total weight of the electrolyte solution for the lithium secondary battery. If the content of lithium nitrate is less than 1 wt. %, relative to the total weight of the electrolyte solution for the lithium secondary battery, the coulombic efficiency may be rapidly lowered. If the content of lithium nitrate exceeds 7 wt. %, the viscosity of the electrolyte solution may increase, making it difficult to operate. Meanwhile, it is preferable that the lithium nitrate and zirconium oxynitrate are contained in an amount of 2 to 8 wt. %, relative to the total weight of the electrolyte solution for the lithium secondary battery, and in this case, the content ratio of lithium nitrate and zirconium oxynitrate may be 15:1 to 3:1, preferably 9.5:1 to 4:1, more preferably 9:1 to 4:1 as a weight ratio, but is not limited thereto. If the total content of lithium nitrate and zirconium oxynitrate is less than 2 wt. %, relative to the total weight of the electrolyte solution for the lithium secondary battery, the coulombic efficiency may be rapidly lowered. If the total content of lithium nitrate and zirconium oxynitrate exceeds 8 wt. %, the viscosity of the electrolyte solution may increase, making it difficult to operate.

Next, the lithium secondary battery according to the present disclosure will be described. The lithium secondary battery comprises a positive electrode, a negative electrode, a separator interposed between the positive electrode and the negative electrode, and the electrolyte solution. The electrolyte solution comprises A) the first solvent, B) the second solvent, C) the lithium salt, D) the zirconium oxynitrate and E) the lithium nitrate, as described above, and detailed descriptions of these are as described above. In addition, the lithium secondary battery may be any lithium secondary battery commonly used in the art, and among them, a lithium-sulfur battery may be most preferred.

Hereinafter, in the lithium secondary battery according to the present disclosure, the positive electrode, the negative electrode, and the separator will be described in more detail.

As described above, the positive electrode comprised in the lithium secondary battery of the present disclosure comprises a positive electrode active material, a binder, and an electrically conductive material. The positive electrode active material may be one that can be applied to a conventional lithium secondary battery, and for example may comprise elemental sulfur ($S_8$), a sulfur-based compound, or a mixture thereof. Specifically, the sulfur-based compound may be $Li_2S_n(n\geq 1)$, an organosulfur compound or a carbon-sulfur composite ($(C_2S_x)_n$: x=2.5-50, n≥2). In addition, the positive electrode active material may include a sulfur-carbon composite, and since the sulfur material alone does not have electrical conductivity, it may be used in combination with an electrically conductive material. The carbon material (or carbon source) constituting the sulfur-carbon composite may have a porous structure or a high specific surface area, and any carbon material may be used as long as it is commonly used in the art. For example, the porous carbon material may be, but is not limited to, at least one selected from the group consisting of graphite; graphene; carbon blacks such as Denka black, acetylene black, Ketjen black, channel black, furnace black, lamp black, and thermal black; carbon nanotubes (CNTs) such as single wall carbon nanotube (SWCNT), and multiwall carbon nanotubes (MWCNT); carbon fibers such as graphite nanofiber (GNF), carbon nanofiber (CNF), and activated carbon fiber (ACF); and activated carbon, and its shape may be spherical, rod-shaped, needle-shaped, plate-shaped, tubular or bulk-shaped, and it can be used without limitation as long as it is commonly used in a lithium secondary battery.

In addition, pores are formed in the carbon material, and the porosity of the pores is 40 to 90%, preferably 60 to 80%. If the porosity of the pores is less than 40%, since lithium ions are not delivered normally, it can act as a resistance component and cause problems. If the porosity of the pores exceeds 90%, a problem of lowering the mechanical strength may occur. In addition, the pore size of the carbon material is 10 nm to 5 µm, preferably 50 nm to 5 µm. If the pore size is less than 10 nm, there may be a problem that lithium ions cannot be transmitted. If the pore size exceeds 5 µm, a short circuit of the battery due to contact between electrodes and safety problems may occur.

The binder is a component that assists in the bonding between a positive electrode active material and an electrically conductive material and the bonding to a current collector, and for example, may be, but is not limited to, at least one selected from the group consisting of polyvinylidenefluoride (PVdF), polyvinylidenefluoride-polyhexafluoropropylene copolymer (PVdF/HFP), polyvinylacetate, polyvinylalcohol, polyvinylether, polyethylene, polyethyleneoxide, alkylated polyethyleneoxide, polypropylene, polymethyl(meth)acrylate, polyethyl(meth)acrylate, polytetrafluoroethylene (PTFE), polyvinylchloride, polyacrylonitrile, polyvinylpyridine, polyvinylpyrrolidone, styrene-butadiene rubber, acrylonitrile-butadiene rubber, ethylene-propylene-diene monomer (EPDM) rubber, sulfonated EPDM rubber, styrene-butylene rubber, fluorine rubber, carboxymethylcellulose (CMC), starch, hydroxypropyl cellulose, regenerated cellulose, and mixtures thereof.

The binder is usually added in an amount of 1 to 50 parts by weight, preferably 3 to 15 parts by weight, based on 100 parts by weight of the total weight of the positive electrode. If the content of the binder is less than 1 part by weight, the adhesive strength between the positive electrode active material and the current collector may be insufficient. If the content of the binder is more than 50 parts by weight, the adhesive strength is improved but the content of the positive electrode active material may be reduced accordingly, thereby lowering the capacity of the battery.

The electrically conductive material comprised in the positive electrode is not particularly limited as long as it does not cause side reactions in the internal environment of the battery and has excellent electrical conductivity while not causing chemical changes in the battery. The electrically conductive material may typically be graphite or electrically conductive carbon, and may be, for example, but is not limited to, one selected from the group consisting of graphite such as natural graphite or artificial graphite; carbon black such as carbon black, acetylene black, Ketjen black, Denka black, thermal black, channel black, furnace black, lamp black, and summer black; carbon-based materials whose crystal structure is graphene or graphite; electrically conductive fibers such as carbon fibers and metal fibers; carbon fluoride; metal powders such as aluminum powder and nickel powder; electrically conductive whiskers such as zinc oxide and potassium titanate; electrically conductive oxides such as titanium oxide; electrically conductive polymers such as polyphenylene derivatives; or a mixture of two or more thereof.

The electrically conductive material is typically added in an amount of 0.5 to 50 parts by weight, preferably 1 to 30 parts by weight based on 100 parts by weight of total weight of the positive electrode. If the content of electrically conductive material is too low, that is, if it is less than 0.5 parts by weight, it is difficult to obtain an effect on the improvement of the electrical conductivity, or the electrochemical characteristics of the battery may be deteriorated. If the content of the electrically conductive material exceeds 50 parts by weight, that is, if it is too much, the amount of positive electrode active material is relatively small and thus capacity and energy density may be lowered. The method of incorporating the electrically conductive material into the positive electrode is not particularly limited, and conventional methods known in the related art such as the coating on the positive electrode active material can be used. Also, if necessary, the addition of the second coating layer with electrical conductivity to the positive electrode active material may replace the addition of the electrically conductive material as described above.

In addition, a filler may be selectively added to the positive electrode of the present disclosure as a component for inhibiting the expansion of the positive electrode. Such a filler is not particularly limited as long as it can inhibit the expansion of the electrode without causing chemical changes in the battery, and examples thereof may comprise olefinic polymers such as polyethylene and polypropylene; fibrous materials such as glass fibers and carbon fibers.

The positive electrode active material, the binder, the electrically conductive material and the like are dispersed and mixed in a dispersion medium (solvent) to form a slurry, and the slurry can be applied onto the positive electrode current collector, followed by drying and rolling it to prepare a positive electrode. The dispersion medium may be, but is not limited to, N-methyl-2-pyrrolidone (NMP), dimethyl formamide (DMF), dimethyl sulfoxide (DMSO), ethanol, isopropanol, water, or a mixture thereof.

The positive electrode current collector may be, but is not limited to, platinum (Pt), gold (Au), palladium (Pd), iridium (Ir), silver (Ag), ruthenium (Ru), nickel (Ni), stainless steel (STS), aluminum (Al), molybdenum (Mo), chromium (Cr), carbon (C), titanium (Ti), tungsten (W), ITO (In doped $SnO_2$), FTO (F doped $SnO_2$), or an alloy thereof, or aluminum (Al) or stainless steel whose surface is treated with carbon (C), nickel (Ni), titanium (Ti) or silver (Ag) or so on. The shape of the positive electrode current collector may be in the form of a foil, film, sheet, punched form, porous body, foam or the like.

The negative electrode is a lithium-based metal, and may further include a current collector on one side of the lithium-based metal. the current collector may be a negative electrode current collector. The negative electrode current collector is not particularly limited as long as it has high electrical conductivity without causing chemical changes in the battery, and may be selected from the group consisting of copper, aluminum, stainless steel, zinc, titanium, silver, palladium, nickel, iron, chromium, and alloys and combinations thereof. The stainless steel can be surface-treated with carbon, nickel, titanium, or silver, and the alloy may be an aluminum-cadmium alloy. In addition, sintered carbon, a non-conductive polymer surface-treated with an electrically conductive material, or a conductive polymer may be used. In general, a thin copper plate is used as the negative electrode current collector.

In addition, the shape of the negative electrode current collector can be various forms such as a film having or not having fine irregularities on a surface, sheet, foil, net, porous body, foam, nonwoven fabric and the like. In addition, the negative electrode current collector is in the thickness range of 3 to 500 μm. If the thickness of the negative electrode current collector is less than 3 μm, the current collecting effect is lowered. On the other hand, if the thickness exceeds 500 μm, when folding and then assembling the cell, there is a problem that the workability is reduced.

The lithium-based metal may be lithium or a lithium alloy. In that case, the lithium alloy contains an element capable of alloying with lithium, and specifically the lithium alloy may be an alloy of lithium and at least one selected from the group consisting of Si, Sn, C, Pt, Ir, Ni, Cu, Ti, Na, K, Rb, Cs, Fr, Be, Mg, Ca, Sr, Sb, Pb, In, Zn, Ba, Ra, Ge, and Al.

The lithium-based metal may be in the form of a sheet or foil, and in some cases, may be in a form in which lithium or a lithium alloy is deposited or coated on a current collector by a dry process, or may be in a form in which metal and an alloy in a particle phase are deposited or coated by a wet process or the like.

A conventional separator may be interposed between the positive electrode and the negative electrode. The separator is a physical separator having a function of physically separating the electrodes, and can be used without particular limitation as long as it is used as a conventional separator, and particularly, a separator with low resistance to ion migration in the electrolyte solution and excellent impregnating ability for the electrolyte solution is preferable.

In addition, the separator enables the transport of lithium ions between the positive electrode and the negative electrode while separating or insulating the positive electrode and the negative electrode from each other. The separator may be made of a porous, nonconductive, or insulating material. The separator may be an independent member such as a film or a coating layer added to the positive electrode and/or the negative electrode.

Examples of the polyolefin-based porous film which can be used as the separator may be films formed of any polymer alone selected from polyethylenes such as high density polyethylene, linear low density polyethylene, low density polyethylene, and ultra-high molecular weight polyethylene, and polyolefin-based polymers such as polypropylene, polybutylene, and polypentene, or formed of a polymer mixture thereof. Examples of the nonwoven fabric that can be used as the separator is a nonwoven fabric formed by a polymer of polyphenyleneoxide, polyimide, polyamide, polycarbonate, polyethyleneterephthalate, poly ethylenenaphthalate, polybutyleneterephthalate, polyphenylenesulfide, polyacetal, polyethersulfone, polyetheretherketone, polyester and the like alone or a mixture thereof. Such nonwoven fabrics include a nonwoven fabric in the form of a fiber to form a porous web, that is, a spunbond or a meltblown nonwoven fabric composed of long fibers.

The thickness of the separator is not particularly limited, but is preferably in the range of 1 to 100 μm, more preferably 5 to 50 μm. If the thickness of the separator is less than 1 μm, the mechanical properties cannot be maintained. If the thickness of the separator exceeds 100 μm, the separator acts as a resistive layer, thereby deteriorating the performance of the battery. The pore size and porosity of the separator are not particularly limited, but it is preferable that the pore size is 0.1 to 50 μm and the porosity is 10 to 95%. If the separator has a pore size of less than 0.1 μm or a porosity of less than 10%, the separator acts as a resistive layer. If the separator has a pore size of more than 50 μm or a porosity of more than 95%, mechanical properties cannot be maintained.

The lithium secondary battery of the present disclosure comprising the positive electrode, the negative electrode, separator, and the electrolyte solution as described above may be manufactured through a process of making the positive electrode face the negative electrode, and interposing a separator therebetween and then injecting the electrolyte solution for the lithium secondary battery according to the present disclosure.

Meanwhile, the lithium secondary battery according to the present disclosure can be not only applicable to a battery cell used as a power source of a small device, but also can be particularly suitably usable as a unit battery of a battery module which is a power source of a medium and large-sized device. In this respect, the present disclosure also provides a battery module in which at least two lithium secondary batteries are electrically connected (in series or in parallel). It is needless to say that the number of lithium secondary batteries comprised in the battery module may be variously adjusted in consideration of the use and capacity of the battery module. In addition, the present disclosure provides a battery pack in which the battery modules are electrically connected according to a conventional technique in the art. The battery module and the battery pack may be used as a power source for at least one medium and large-sized device selected from power tools; electric cars comprising an electric vehicle (EV), a hybrid electric vehicle (HEV), and a plug-in hybrid electric vehicle (PHEV); electric trucks; electric commercial vehicles; or power storage systems, but the present disclosure is not limited thereto.

Hereinafter, preferred examples are provided to help understanding of the present disclosure, but the following examples are only for exemplifying the present disclosure, and it is apparent to those skilled in the art that various changes and modifications can be made within the scope and spirit of the present disclosure, and such changes and modifications are within the scope of the appended claims.

Example 1

Manufacture of Lithium Secondary Battery

Preparation of Electrolyte Solution

First, to the organic solvent prepared by mixing 2-methylfuran (the first solvent) and dimethoxyethane (the second solvent) in a volume ratio (v/v) of 2:8, based on the total weight of the electrolyte solution, 4.5% by weight of lithium nitrate ($LiNO_3$) and 0.5% by weight of zirconium oxynitrate ($ZrO(NO_3)_2$) were added and dissolved, so that the concentration of LiFSI (lithium salt) was 0.75 M, to prepare an electrolyte solution. Here, the zirconium oxynitrate is prepared by vacuum drying $ZrO(NO_3)_2 \cdot xH_2O$ from ALFA AESAR company at 80° C. for 48 hours to remove $H_2O$.

Manufacture of Positive Electrode

Separately, 87.5 parts by weight of sulfur-carbon (CNT) composite (S/C 75:25 weight ratio) as a positive electrode active material, 5 parts by weight of Denka black as an electrically conductive material, and 7.5 parts by weight of styrene butadiene rubber/carboxymethyl cellulose (SBR/CMC 7:3) as a binder were mixed to prepare a slurry composition for positive electrode, and then the prepared slurry composition was coated on a current collector (Al Foil), dried at 80° C. for 12 hours, and pressed by a roll press machine to manufacture a positive electrode (at this time, the loading amount was 5.0-5.5 mAh/cm², and the porosity of the electrode was 65%).

Manufacture of Lithium Secondary Battery (Lithium-Sulfur Battery)

The prepared positive electrode and the negative electrode, which was manufactured by rolling a lithium foil (Honzo company) with a thickness of 35 μm on a copper current collector, are placed to face each other, a polyethylene (PE) separator was interposed therebetween, and the prepared electrolyte solution was injected and sealed to manufacture a coin cell type lithium-sulfur battery. Meanwhile, in the manufacture of the battery, a 14 phi circular electrode was punched and used as the positive electrode, and the polyethylene separator was punched with 19phi and used, and the lithium foil was punched with 16phi and used.

Example 2, Comparative Example 1~5

Manufacture of Lithium Secondary Battery

Lithium-sulfur batteries corresponding to Example 2 and Comparative Examples 1 to 5 were manufactured in the same manner as in Example 1 above, respectively, except for the changes as in the composition of Table 1 below.

TABLE 1

| | Electrolyte solution | | | | |
|---|---|---|---|---|---|
| | First solvent | Second solvent | lithium salt | Lithium nitrate | Zirconium oxynitrate |
| Example 1 | 2-methyl-furan 20% | dimethoxy-ethane 80% | LiFSI 0.75M | LiNO$_3$ 4.5 wt % | ZrO(NO$_3$)$_2$ 0.5 wt % |
| Example 2 | 2-methyl-furan 20% | dimethoxy-ethane 80% | LiFSI 0.75M | LiNO$_3$ 4 wt % | ZrO(NO$_3$)$_2$ 1 wt % |
| Comparative Example 1 | 1,3-dioxolane 20% | dimethoxy-ethane 80% | LiTFSI 0.75M | — | ZrO(NO$_3$)$_2$ 2 wt % |
| Comparative Example 2 | 2-methyl-furan 20% | dimethoxy-ethane 80% | LiFSI 0.75M | LiNO$_3$ 5 wt % | — |
| Comparative Example 3 | 2-methyl-furan 20% | dimethoxy-ethane 80% | LiFSI 0.75M | — | ZrO(NO$_3$)$_2$ 2 wt % |
| Comparative Example 4 | 2-methyl-furan 20% | dimethoxy-ethane 80% | LiTFSI 0.75M | LiNO$_3$ 4.5 wt % | ZrO(NO$_3$)$_2$ 0.5 wt % |
| Comparative Example 5 | 1,3-dioxolane 20% | dimethoxy-ethane 80% | LiFSI 0.75M | LiNO$_3$ 4.5 wt % | ZrO(NO$_3$)$_2$ 0.5 wt % |
| Comparative Example 6 | 2-methyl-furan 20% | dimethoxy-ethane 80% | LiFSI 0.75M | LiNO$_3$ 4.7 wt % | ZrO(NO$_3$)$_2$ 0.3 wt % |
| Comparative Example 7 | 2-methyl-furan 20% | dimethoxy-ethane 80% | LiFSI 0.75M | LiNO$_3$ 3.5 wt % | ZrO(NO$_3$)$_2$ 1.5 wt % |

Experimental Example 1

Evaluation of Cycle Lifetime of Lithium Secondary Battery

For the lithium-sulfur batteries manufactured in Examples 1 and 2 and Comparative Examples 1 to 7 above, discharging was performed at 0.1 C until reaching 1.8 V at OCV (open circuit voltage) in CC mode at 25° C., and 2.5 cycles were carried out with the protocol of charging at 0.1 C until reaching 2.5 V again, and after the battery stabilization cycle, a 0.3 C charging/0.5 C discharging cycles were performed in a voltage range between 1.8 V and 2.5 V to evaluate the baseline cycle lifetime which maintains 80% of the high-rate initial capacity, and the results are shown in Table 2 below.

TABLE 2

| | Number of Cycle (80% capacity retention rate) |
|---|---|
| Example 1 | 291 |
| Example 2 | 244 |
| Comparative Example 1 | 33 |
| Comparative Example 2 | 179 |
| Comparative Example 3 | 64 |
| Comparative Example 4 | 58 |
| Comparative Example 5 | 45 |
| Comparative Example 6 | 110 |
| Comparative Example 7 | 164 |

Figure 1:
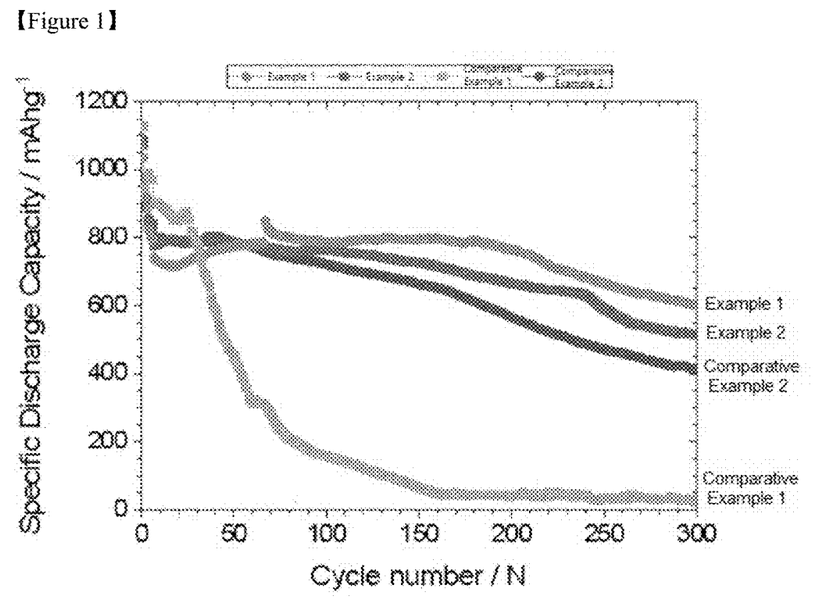
FIG. 1 is a graph showing cycle lifetime performance of lithium secondary batteries manufactured according to an Example of the present disclosure and a Comparative Example.
Figure 2:
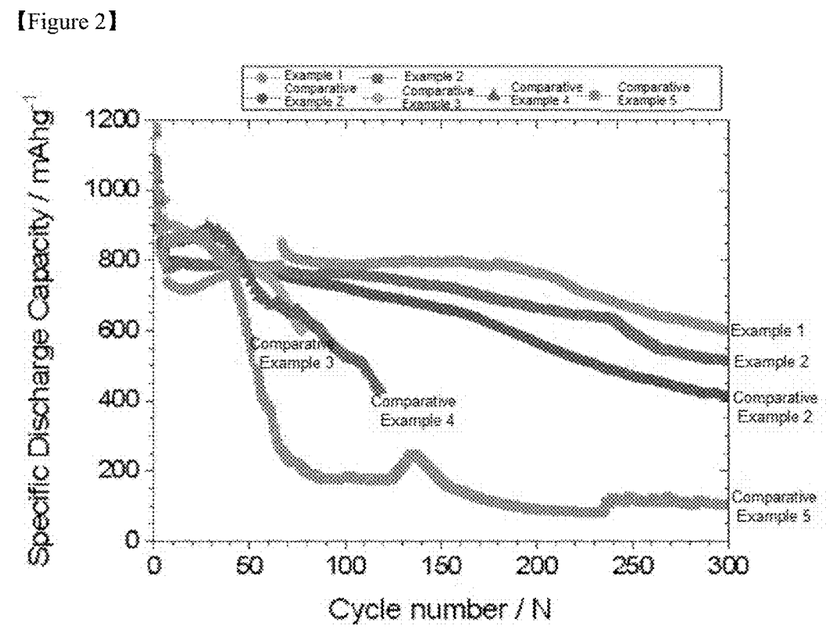
FIG. 2 is a graph showing cycle lifetime performance of lithium secondary batteries manufactured according to an Example of the present disclosure and a Comparative Example.
Figure 3:
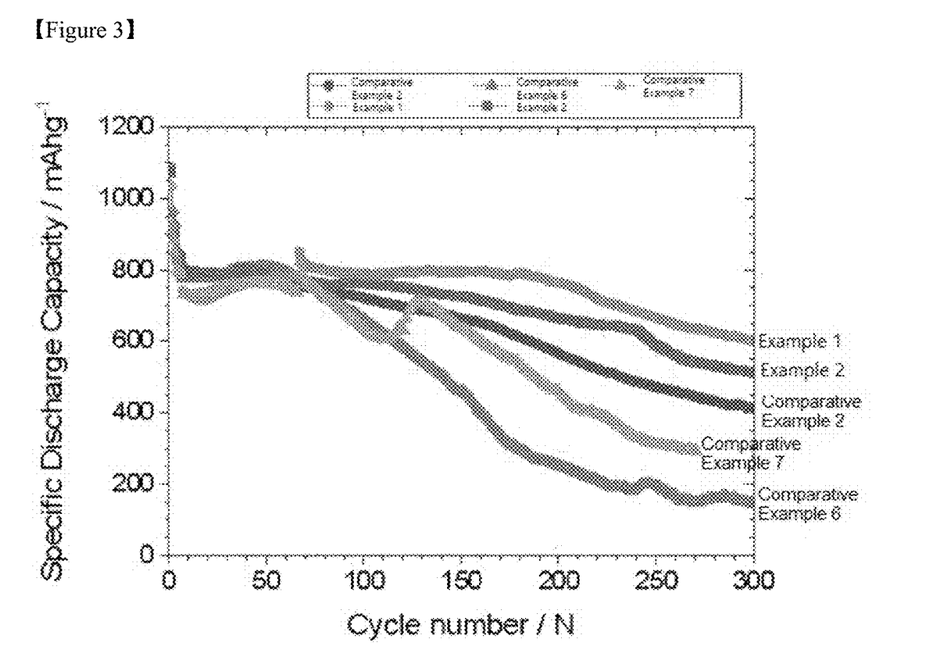
FIG. 3 is a graph showing cycle lifetime performance of lithium secondary batteries manufactured according to an Example of the present disclosure and a Comparative Example.

FIGS. 1 to 3 are graphs showing cycle lifetime performance of lithium secondary batteries manufactured according to an Example of the present disclosure and a Comparative Example. As shown in FIGS. 1 to 3 and Table 2, it was confirmed that the lithium-sulfur batteries of Examples 1 and 2 using 2-methylfuran instead of 1,3-dioxolane (DOL) as the first solvent and LiFSI instead of LiTFSI as the lithium salt while using lithium nitrate and zirconium oxynitrate in a weight ratio of 15:1 to 3:1 (preferably, a weight ratio of 9.5:1 to 4:1) have superior cycle lifetimes, as compared to each of "lithium-sulfur battery of Comparative Example 1 in which 1,3-dioxolane (DOL) was used as the first solvent, LiTFSI was used as lithium salt, and lithium nitrate was not used", "lithium-sulfur battery of Comparative Example 2 without zirconium oxynitrate", "lithium-sulfur battery of Comparative Example 3 without lithium nitrate", "lithium-sulfur battery of Comparative Example 4 using LiTFSI as lithium salt", "lithium-sulfur battery of Comparative Example 5 using 1,3-dioxolane (DOL) as the first solvent", "lithium-sulfur battery of Comparative Example 6 in which the content ratio of lithium nitrate and zirconium oxynitrate is about 16:1 by weight", and "lithium-sulfur battery of Comparative Example 7 in which the content ratio of lithium nitrate and zirconium oxynitrate is about 2.3:1 by weight".

In other words, it was confirmed that if 1,3-dioxolane (DOL), not 2-methylfuran, is used as the first solvent, or if neither zirconium oxynitrate nor lithium nitrate is used, or if both lithium nitrate and zirconium oxynitrate are used, but their content ratio is not in the range of weight ratio of 15:1 to 3:1 (preferably, weight ratio of 9.5:1 to 4:1), or LiTFSI is used as the lithium salt, there is a limit in improving the cycle lifetime, and thus only when all of the above conditions are satisfied, the cycle lifetime can be improved as in the present disclosure. Additionally, it was confirmed through comparison/contrast in Examples 1 and 2 above that if the content of lithium nitrate is relatively increased within the range of the weight ratio of lithium nitrate and zirconium oxynitrate, the cycle lifetime of the battery is further improved.

The invention claimed is:

1. An electrolyte solution for a lithium secondary battery, the electrolyte solution comprising:
   a first solvent comprising a heterocyclic compound containing one or more double bonds and any one of an oxygen atom or a sulfur atom;
   a second solvent comprising at least one of an ether-based compound, an ester-based compound, an amide-based compound, or a carbonate-based compound;
   a lithium salt;
   zirconium oxynitrate; and
   lithium nitrate,
   wherein the lithium nitrate and the zirconium oxynitrate are contained in an amount of 2 to 8 wt. %, relative to the total weight of the electrolyte solution,
   wherein the content ratio of the lithium nitrate to the zirconium oxynitrate is 15:1 to 3:1 by weight, and
   wherein the lithium salt comprises LiFSI ((SO$_2$F)$_2$NLi), and does not comprise LiTFSI ((CF$_3$SO$_2$)$_2$NLi).

2. The electrolyte solution according to claim 1, wherein the lithium salt further comprises one or more selected from the group consisting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiC$_4$BO$_8$, LiAsF$_6$, LiSbF$_6$, LiAlCl$_4$, CH$_3$SO$_3$Li, CF$_3$SO$_3$Li, (C$_2$F$_5$SO$_2$)$_2$NLi, LiFSI ((SO$_2$F)$_2$NLi), (CF$_3$SO$_2$)$_3$CLi, lithium chloroborane, lithium carboxylate of short-chain aliphatic carboxylic acid having 4 or less carbon atoms, lithium tetraphenyl borate, and lithium imide.

3. The electrolyte solution according to claim 1, wherein the concentration of the lithium salt in the electrolyte solution is 0.2 to 2.0 M.

4. The electrolyte solution according to claim 1, wherein the heterocyclic compound is a 3 to 15 membered heterocyclic compound unsubstituted or substituted by at least one selected from the group consisting of an alkyl group having 1 to 4 carbon atoms, a cyclic alkyl group having 3 to 8 carbon atoms, an aryl group having 6 to 10 carbon atoms, a halogen group, a nitro group, an amine group, and a sulfonyl group, or a multi-cyclic compound of at least one of a cyclic alkyl group having 3 to 8 carbon atoms and an aryl group having 6 to 10 carbon atoms and a heterocyclic compound.

5. The electrolyte solution according to claim 1, wherein the heterocyclic compound is selected from the group consisting of furan, 2-methylfuran, 3-methylfuran, 2-ethylfuran, 2-propylfuran, 2-butylfuran, 2,3-dimethylfuran, 2,4-dimethylfuran, 2,5-dimethylfuran, pyran, 2-methylpyran, 3-methylpyran, 4-methylpyran, benzofuran, 2-(2-nitrovinyl) furan, thiophene, 2-methylthiophene, 2-ethylthiophene, 2-propylthiophene, 2-butylthiophene, 2,3-dimethylthiophene, 2,4-dimethylthiophene, and 2,5-dimethylthiophene.

6. The electrolyte solution according to claim 1, wherein the second solvent comprises at least one ether-based compound selected from the group consisting of dimethyl ether, diethyl ether, dipropylether, methylethylether, methylpropylether, ethylpropylether, dimethoxyethane, diethoxyethane, methoxyethoxyethane, diethylene glycol dimethylether, diethylene glycol diethylether, diethylene glycol methylethylether, triethylene glycol dimethylether, triethylene glycol diethylether, triethylene glycol methylethylether, tetraethylene glycol dimethylether, tetraethylene glycol diethylether, tetraethylene glycol methylethylether, polyethylene glycol dimethylether, polyethylene glycol diethylether, and polyethylene glycol methylethylether.

7. The electrolyte solution according to claim 1, wherein the electrolyte solution further comprises at least one selected from the group consisting of lanthanum nitrate, potassium nitrate, cesium nitrate, magnesium nitrate, barium nitrate, lithium nitrite, potassium nitrite, and cesium nitrite.

8. The electrolyte solution according to claim 1, wherein the electrolyte solution comprises 2-methylfuran as the first solvent, dimethoxyethane as the second solvent, LiFSI as the lithium salt, the zirconium oxynitrate, and the lithium nitrate.

9. A lithium secondary battery comprising a positive electrode; a negative electrode; a separator between the positive electrode and the negative electrode; and the electrolyte solution according to claim 1.

10. The lithium secondary battery according to claim 9, wherein the lithium secondary battery is a lithium-sulfur battery.

* * * * *